(12) United States Patent
Tamaki et al.

(10) Patent No.: US 8,228,309 B2
(45) Date of Patent: Jul. 24, 2012

(54) DISPLAY APPARATUS AND INFORMATION INPUT APPARATUS

(75) Inventors: Masaya Tamaki, Kanagawa (JP); Takeo Koito, Aichi (JP)

(73) Assignee: Sony Corporation (JP)

( * ) Notice: Subject to any disclaimer, the term of this patent is extended or adjusted under 35 U.S.C. 154(b) by 259 days.

(21) Appl. No.: 12/657,564

(22) Filed: Jan. 22, 2010

(65) Prior Publication Data

US 2010/0188365 A1 Jul. 29, 2010

(30) Foreign Application Priority Data

Jan. 26, 2009 (JP) ................ P2009-014670

(51) Int. Cl.
*G06F 3/041* (2006.01)
(52) U.S. Cl. ............ 345/173; 345/174; 349/12
(58) Field of Classification Search ......... 345/173–174; 349/155, 12, 23, 156
See application file for complete search history.

(56) References Cited

U.S. PATENT DOCUMENTS

| 6,501,529 | B1 | 12/2002 | Kurihara et al. | |
| 2007/0024798 | A1* | 2/2007 | Choi et al. | 349/155 |
| 2007/0070047 | A1 | 3/2007 | Jeon et al. | |
| 2008/0018613 | A1* | 1/2008 | Kim et al. | 345/173 |
| 2008/0055502 | A1* | 3/2008 | Wu et al. | 349/38 |
| 2008/0237894 | A1* | 10/2008 | Kim et al. | 257/783 |
| 2009/0002336 | A1* | 1/2009 | Choi et al. | 345/174 |
| 2009/0058826 | A1* | 3/2009 | Lee et al. | 345/173 |
| 2009/0091546 | A1* | 4/2009 | Joo et al. | 345/173 |
| 2009/0160789 | A1* | 6/2009 | Kreit et al. | 345/173 |

FOREIGN PATENT DOCUMENTS

| JP | 2001-075074 A | 3/2001 |
| JP | 2007-052368 A | 3/2007 |
| JP | 2007-095044 A | 4/2007 |
| JP | 2008065302 A | 3/2008 |

OTHER PUBLICATIONS

Office Action from Japanese Application No. 2009-014670, dated Dec. 21, 2010.

* cited by examiner

*Primary Examiner* — Amare Mengistu
*Assistant Examiner* — Hong Zhou
(74) *Attorney, Agent, or Firm* — Lerner, David, Littenberg, Krumholz & Mentlik, LLP

(57) ABSTRACT

A display apparatus includes a display panel including a first substrate, a second substrate opposed to the first substrate, and a touch sensor switch disposed in a display area that displays an image. The touch sensor switch includes a first touch electrode provided on a surface of the first substrate and a second touch electrode provided on a surface of the second substrate. The touch sensor switch has a structure in which the first and second touch electrodes are brought into contact when the display panel is deformed by an external pressure. The first substrate includes a convex portion that protrudes in a convex shape toward the second substrate. The convex portion has a top surface opposed to the second substrate and includes a flat area formed on the top surface. The first touch electrode is formed in the flat area on the convex portion as an isolated pattern.

7 Claims, 16 Drawing Sheets

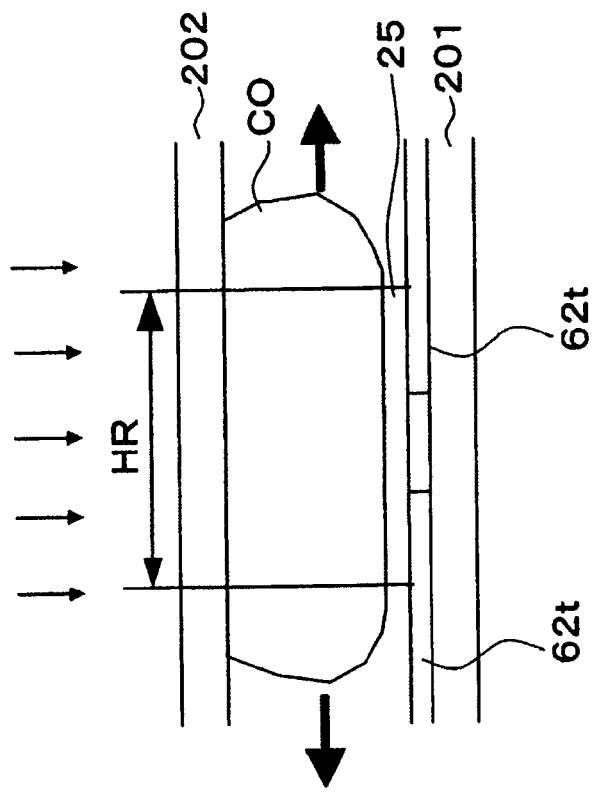
FIG.6A (Before application of external pressure)
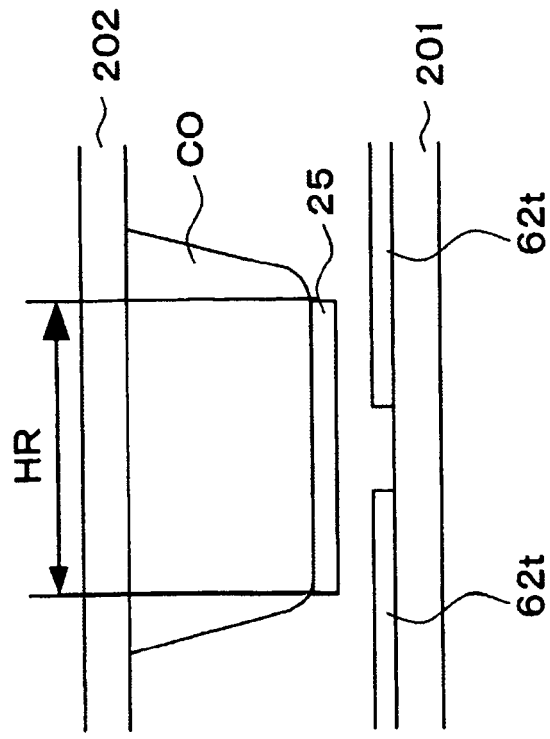
FIG.6B (After application of external pressure)

| Tapered angle θ (°) | Pressure (Pa) | Amount of deformation (m) |
|---|---|---|
| 90 | 1.00E+09 | 1.050E-04 |
| 78 | 1.11E+09 | 1.050E-04 |
| 68 | 1.22E+09 | 6.480E-05 |
| 59 | 1.37E+09 | 7.000E-05 |
| 51 | 1.54E+09 | 7.730E-05 |
| 45 | 1.75E+09 | 8.480E-05 |

FIG.7

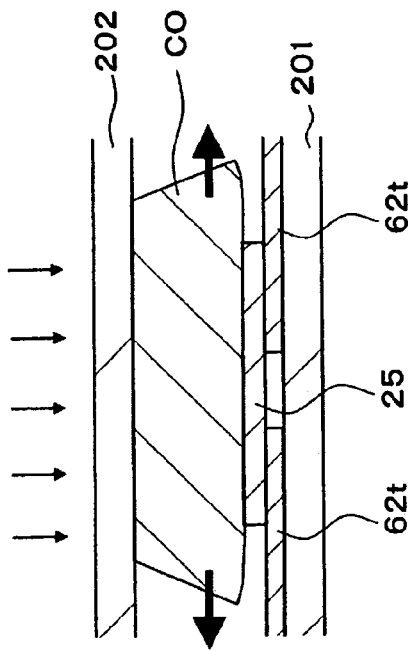
FIG.8A (Before application of external pressure)
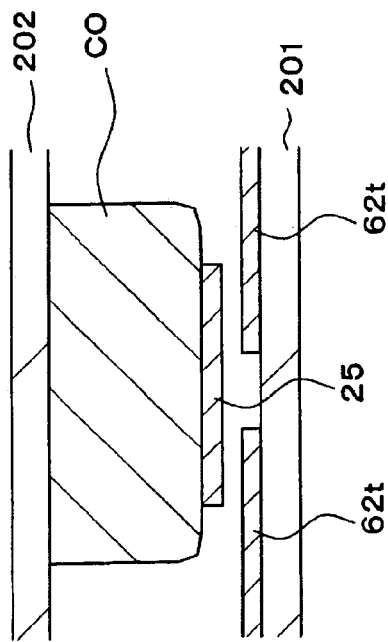
FIG.8B
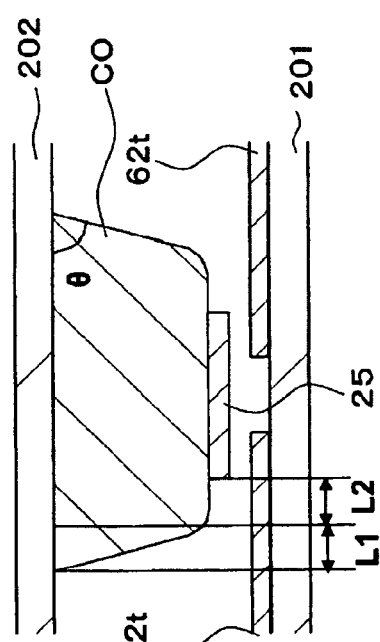
(After application of external pressure)

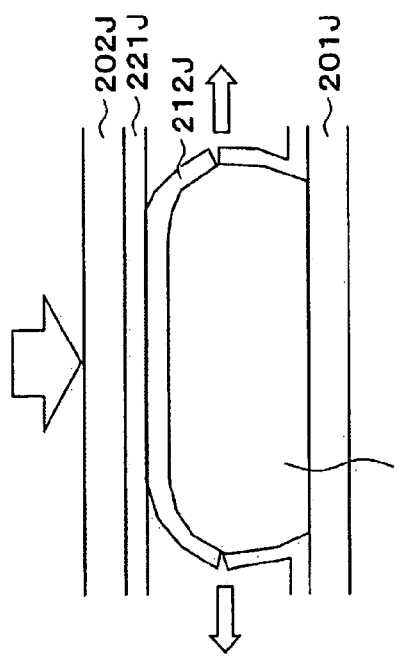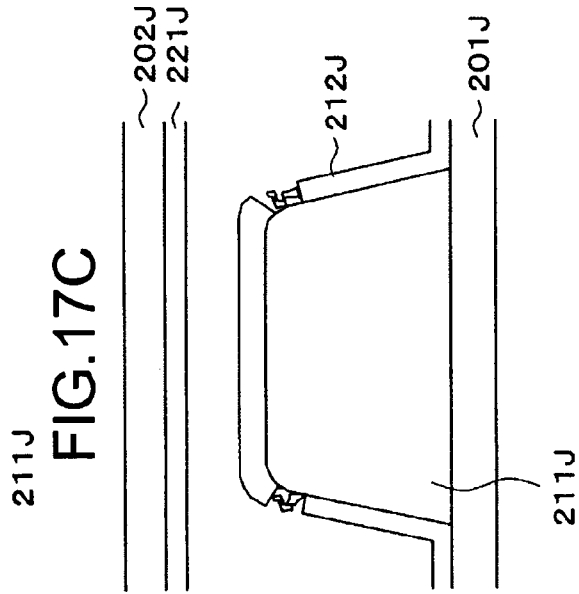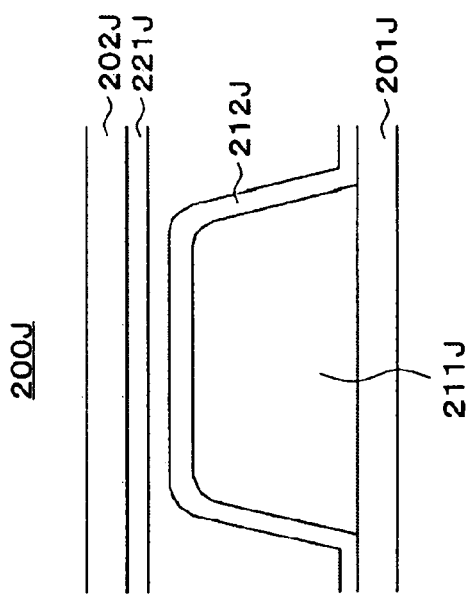

DISPLAY APPARATUS AND INFORMATION INPUT APPARATUS

CROSS-REFERENCE TO RELATED APPLICATION

The present application claims priority from Japanese Patent Application No. JP 2009-014670 filed in the Japanese Patent Office on Jan. 26, 2009, the entire content of which is incorporated herein by reference.

BACKGROUND OF THE INVENTION

1. Field of the Invention

The present invention relates to a display apparatus and an information input apparatus. In particular, the present invention relates to a display apparatus and an information input apparatus in which a touch sensor switch is provided on a pair of substrates opposed to each other.

2. Description of the Related Art

A display apparatus such as a liquid crystal display apparatus and an organic EL display apparatus has advantages of being thin, lightweight, and small in power consumption. Therefore, a display apparatus is widely being used for a mobile electronic apparatus such as a cellular phone and a digital camera.

Among such display apparatuses, a liquid crystal display apparatus has, as a display panel, a liquid crystal panel in which a liquid crystal layer is sealed between a pair of substrates. The liquid crystal panel is a transmissive type, and modulates and transmits illumination light emitted from an illumination apparatus such as a backlight provided on a back surface of the liquid crystal panel. The illumination light modulated causes an image to be displayed on a front surface of the liquid crystal panel.

The liquid crystal panel is an active matrix type, and includes a TFT (thin film transistor) array substrate in which a plurality of TFTs that function as pixel switching elements are formed. Further, in the liquid crystal panel, an opposed substrate is disposed so as to be opposed to the TFT array substrate, and a liquid crystal layer is provided between the TFT array substrate and the opposed substrate. In the active-matrix liquid crystal panel, a pixel switching element inputs a potential in a pixel electrode, thereby applying a voltage to the liquid crystal layer. Then, light transmitted through the pixel is controlled, thereby displaying the image.

In the display apparatus as described above, a touch panel as an information input apparatus may be provided on a display panel in some cases in order to allow a user to input operation data by using images such as icons displayed on a screen of the display panel.

However, in a case where the touch panel is externally provided on the display panel, an entire thickness of the display panel is increased, which may impair the advantage of being thin. In addition, providing the touch panel may cause a case where light that passes through the display area may be reduced or a case where the light may be interfered, which may result in a reduction in quality of the display image. Further, a problem of a reduction in manufacturing efficiency, an increase in manufacturing cost, or the like may arise.

In view of this, a display apparatus in which a touch panel function is implemented in a display panel has been proposed.

For example, a liquid crystal display apparatus in which a resistive touch sensor is built in a liquid crystal panel has been proposed.

In this case, the touch sensor includes a touch sensor switch formed by providing touch electrodes on the pair of substrates that constitutes the liquid crystal panel. When the liquid crystal panel is pressed and deformed, the touch electrodes are electrically connected with each other. In the liquid crystal panel, the touch electrodes are provided on a convex portion that protrudes in a convex shape so that the touch electrodes formed on the substrates are electrically connected with each other with a small external pressure (see, for example, Japanese Patent Application Laid-open Nos. 2001-75074, 2007-52368, and 2007-95044).

SUMMARY OF THE INVENTION

However, in the display apparatus mentioned above, along with the reduction in thickness of the display panel, a member such as the electrode may be damaged by the external pressure, which may impair reliability of the apparatus.

In particular, in the case where the touch electrodes each are provided on the convex portion in the liquid crystal panel having the built-in touch sensor switch, the above problem may be apparently exposed because the touch electrode has a rigid body. For example, the touch electrodes are disconnected, and the touch panel function may be impaired. In addition, conductive foreign matters generated by crushing the touch electrodes may disperse in the liquid crystal cell, with the result that a problem of short-circuiting the touch electrodes may be caused.

FIGS. 17A to 17C are cross-sectional views each showing main components of a liquid crystal panel 200J having a touch sensor switch build therein.

As shown in FIG. 17A, on a TFT array substrate 201J, a touch electrode 212J is formed on a convex portion 211J that protrudes in a convex shape. Meanwhile, a touch electrode 221J is provided on an opposed substrate 202J.

In this case, when the opposed substrate 202J is pressed toward the TFT array substrate 201J and deformed as shown in FIG. 17B, the touch electrode 221J on the upper side is brought into contact with the touch electrode 212J on the lower side. At this time, as shown in FIG. 17B, in the convex portion 211J, an inflection part from an upper surface portion to a side surface portion is largely deformed. As a result, a part of the touch electrode 212J, which is formed on the convex portion 211J, may be broken due to the deformation.

For this reason, as shown in FIG. 17C, the touch electrode 212J is broken and the problem mentioned above may be caused.

To overcome the above-mentioned problem, it can be thought that an area of the surface of the convex portion, on which the touch electrode is provided, is increased. In this case, however, an aperture ratio of the liquid crystal panel is reduced, which may result in the reduction in quality of the display image.

As described above, in the display apparatus, the problems of the reduction in the image quality along with the reduction in the aperture ratio, the reduction in the reliability of the apparatus, and the like may be caused.

In view of the above-mentioned circumstances, it is desirable to provide a display apparatus and an information input apparatus that are capable of increasing the image quality and increasing the reliability of the apparatuses.

According to an embodiment of the present invention, there is provided a display apparatus including a display panel. The display panel includes a first substrate, a second substrate, and a touch sensor switch incorporated therein, the second substrate being opposed to the first substrate at an interval, the touch sensor switch being disposed in a display area that displays an image. The touch sensor switch includes a first touch electrode provided on a surface of the first substrate, the surface being opposed to the second substrate and a second touch electrode provided on a surface of the second substrate, the surface being opposed to the first substrate, the second touch electrode and the first touch electrode having an interval therebetween. The touch sensor switch has a structure in which the first touch electrode and the second touch electrode are brought into contact with each other when the display panel is deformed by an external pressure. The first substrate includes a convex portion that protrudes in a convex shape toward the second substrate, the convex portion being formed on the surface opposed to the second substrate. The convex portion has a top surface opposed to the second substrate and includes a flat area formed on the top surface along the surface of the second substrate. The first touch electrode is formed in the flat area on the convex portion as an isolated pattern.

According to another embodiment of the present invention, there is provided an information input apparatus including a touch panel. The touch panel includes a first substrate, a second substrate, and a touch sensor switch formed therein, the second substrate being opposed to the first substrate at an interval. The touch sensor switch includes a first touch electrode provided on a surface of the first substrate, the surface being opposed to the second substrate and a second touch electrode provided on a surface of the second substrate, the surface being opposed to the first substrate, the second touch electrode and the first touch electrode having an interval therebetween. The touch sensor switch has a structure in which the first touch electrode and the second touch electrode are brought into contact with each other when the touch panel is deformed by an external pressure. The first substrate includes a convex portion that protrudes in a convex shape toward the second substrate, the convex portion being formed on the surface opposed to the second substrate. The convex portion has a top surface opposed to the second substrate and includes a flat area formed on the top surface along the surface of the second substrate. The first touch electrode is formed in the flat area on the convex portion as an isolated pattern.

In the embodiments of the present invention, the convex portion is formed on the surface of the first substrate, which is opposed to the second substrate. Here, the flat area is formed on the top surface of the convex portion, which is opposed to the second substrate. In addition, the first touch electrode that constitutes the touch sensor is formed in the flat area on the convex portion as the isolated pattern.

According to the present invention, it is possible to provide the display apparatus and the information input apparatus that are capable of increasing the image quality and the reliability of the apparatuses.

These and other objects, features and advantages of the present invention will become more apparent in light of the following detailed description of best mode embodiments thereof, as illustrated in the accompanying drawings.

BRIEF DESCRIPTION OF DRAWINGS

FIG. 6 are cross-sectional views showing a state where a detection target object touches a display area of the liquid crystal panel in the liquid crystal display apparatus according to the first embodiment of the present invention;

FIG. 7 is a diagram showing a relationship between a tapered angle θ of a convex portion and an amount of deformation in the first embodiment of the present invention;

FIG. 8 are cross-sectional views each showing a state where the convex portion is deformed depending on the tapered angle θ in the first embodiment of the present invention;

FIG. 17 are cross-sectional views each showing main part components of a liquid crystal panel having a built-in touch sensor switch.

DESCRIPTION OF PREFERRED EMBODIMENTS

Embodiments of the present invention will be described with reference to the drawings.

The description will be given in an order of the following items.

1. First embodiment
2. Second embodiment (case where FFS mode is employed)
3. Third embodiment (case where suspended column is provided)
4. Others 1. First Embodiment Structure of Liquid Crystal Display Apparatus FIG. 1 is a cross-sectional view showing a structure of a liquid crystal display apparatus 100 according to a first embodiment of the present invention.

Figure 1:
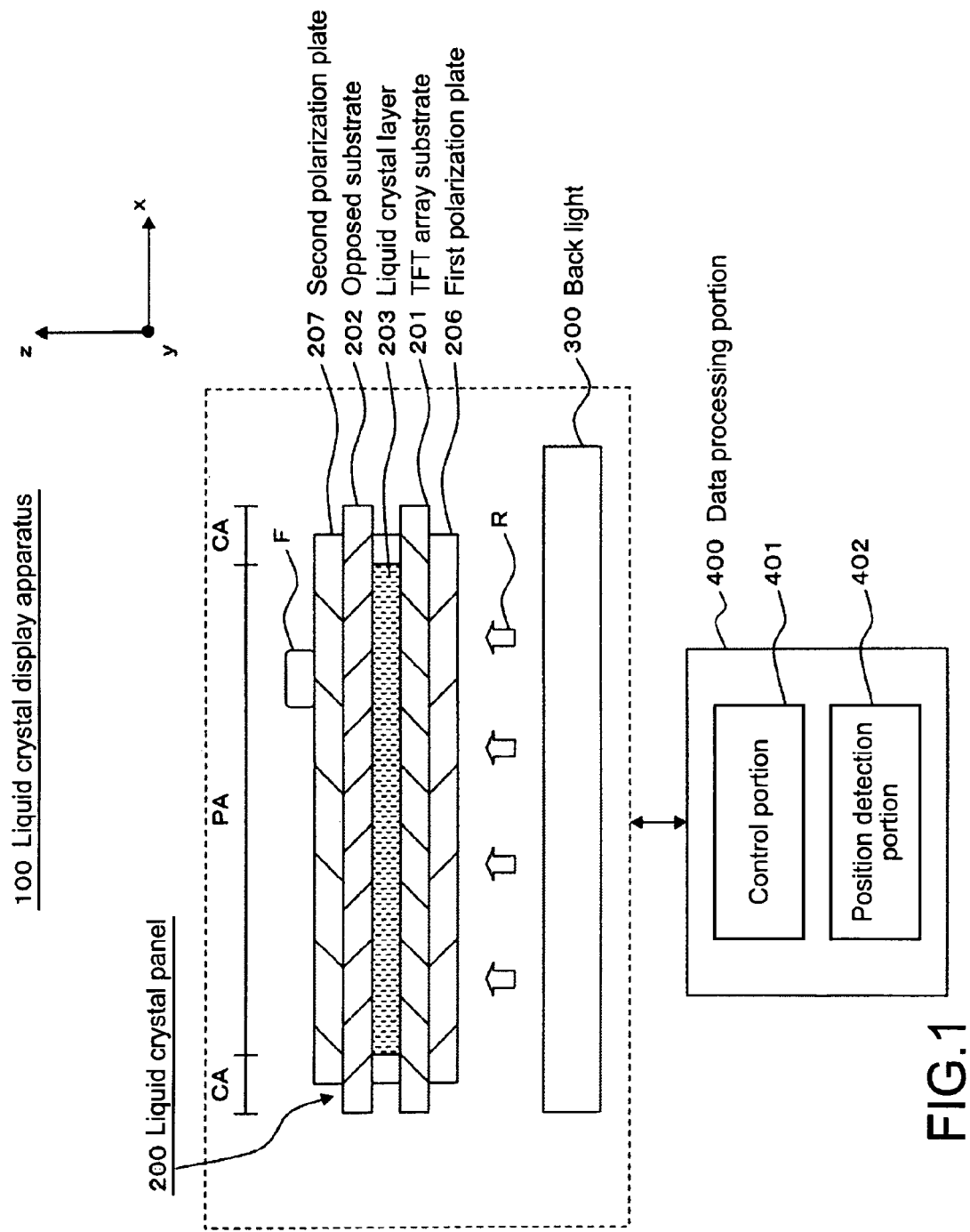
FIG. 1 is a cross-sectional view showing a structure of a liquid crystal display apparatus according to a first embodiment of the present invention.

As shown in FIG. 1, the liquid crystal display apparatus 100 of this embodiment includes a liquid crystal panel 200, a backlight 300, and a data processing portion 400. Those portions will be sequentially described.

The liquid crystal panel 200 is an active matrix type, for example, and includes a TFT array substrate 201, an opposed substrate 202, and a liquid crystal layer 203, as shown in FIG. 1. In the liquid crystal panel 200, the TFT array substrate 201 and the opposed substrate 202 are opposed to each other at an interval. Further, the liquid crystal layer 203 is provided between the TFT array substrate 201 and the opposed substrate 202.

As shown in FIG. 1, in the liquid crystal panel 200, on a surface of the TFT array substrate 201 that constitutes the liquid crystal panel 200, which is not opposed to the opposed substrate 202, a first polarization plate 206 is provided. Further, on a surface of the opposed substrate 202, which is not opposed to the TFT array substrate 201, a second polarization plate 207 is provided.

In the liquid crystal panel 200, on the side of the TFT array substrate 201, the backlight 300 is disposed. The backlight 300 emits illumination light R with which the surface of the TFT array substrate 201, which is not opposed to the opposed substrate 202, is irradiated.

The liquid crystal panel 200 includes a display area PA on which a plurality of pixels (not shown) are disposed. A back surface of the display area PA is irradiated with the illumination light R emitted from the backlight 300 disposed on the back surface side of the liquid crystal panel 200 through the first polarization plate 206, and the illumination light R received on the back surface is modulated in the display area PA.

In this case, a plurality of TFTs are provided as pixel switching elements (not shown) so as to correspond to the pixels on the TFT array substrate 201. The pixel switching elements are controlled, thereby modulating the illumination light received on the back surface. Then, the modulated illumination light R is traveled toward the front side through the second polarization plate 207, and an image is displayed on the display area PA. For example, a color image is displayed on the front side of the liquid crystal panel 200. That is, the liquid crystal panel 200 is a transmissive type.

Although details will be described later, in this embodiment, the liquid crystal panel 200 includes a resistive touch sensor (not shown). The touch sensor is structured so as to output signals whose potentials differ depending on positions touched by a detection target object F such as a user's finger to the front surface of the liquid crystal panel 200, which is opposite to the back surface on which the backlight 300 is provided. That is, the liquid crystal panel 200 functions as the touch panel, with the result that the liquid crystal display apparatus 100 functions as the information input apparatus.

As shown in FIG. 1, the backlight 300 is opposed to the back surface of the liquid crystal panel 200 and emits the illumination light R to the display area PA of the light crystal panel 200.

Specifically, with respect to the TFT array substrate 201 and the opposed substrate 202 that constitute the liquid crystal panel 200, the backlight 300 is disposed not on the side of the opposed substrate 202 but on the side of the TFT array substrate 201. Further, the backlight 300 irradiates the surface of the TFT array substrate 201, which is not opposed to the opposed substrate 202, with the illumination light R. That is, the backlight 300 emits the illumination light R so as to travel from the side of the TFT array substrate 201 to the side of the opposed substrate 202. In this case, the backlight 300 emits the illumination light R in a z direction that is normal to the surface of the liquid crystal panel 200.

As shown in FIG. 1, the data processing portion 400 includes a control portion 401 and a position detection portion 402. The data processing portion 400 includes a computer that operates as respective portions in accordance with a program.

The control portion 401 of the data processing portion 400 controls operations of the liquid crystal panel 200 and the backlight 300. The control portion 401 supplies a control signal to the liquid crystal panel 200, thereby controlling the operation of the plurality of pixel switching elements (not shown) on the liquid crystal panel 200. For example, a line-sequential drive is performed. In addition, by supplying the control signal to the backlight 300, the control portion 401 controls the operation of the backlight 300 and causes the backlight 300 to emit the illumination light R. In this way, the control portion 401 controls the operations of the liquid crystal panel 200 and the backlight 300, thereby causing the display area PA of the liquid crystal panel 200 to display an image.

In addition, by supplying the control signal to the liquid crystal panel 200, the control portion 401 controls an operation of the resistive touch sensor provided to the liquid crystal panel 200, thereby collecting data.

The position detection portion 402 of the data processing portion 400 detects a position of the detection target object F such as the user's finger that touches the display area PA. In this embodiment, the position detection portion 402 detects the position based on data obtained from the resistive touch sensor provided on the liquid crystal panel 200.

(Overall Structure of Liquid Crystal Panel)

An overall structure of the liquid crystal panel 200 will be described.

Figure 2:
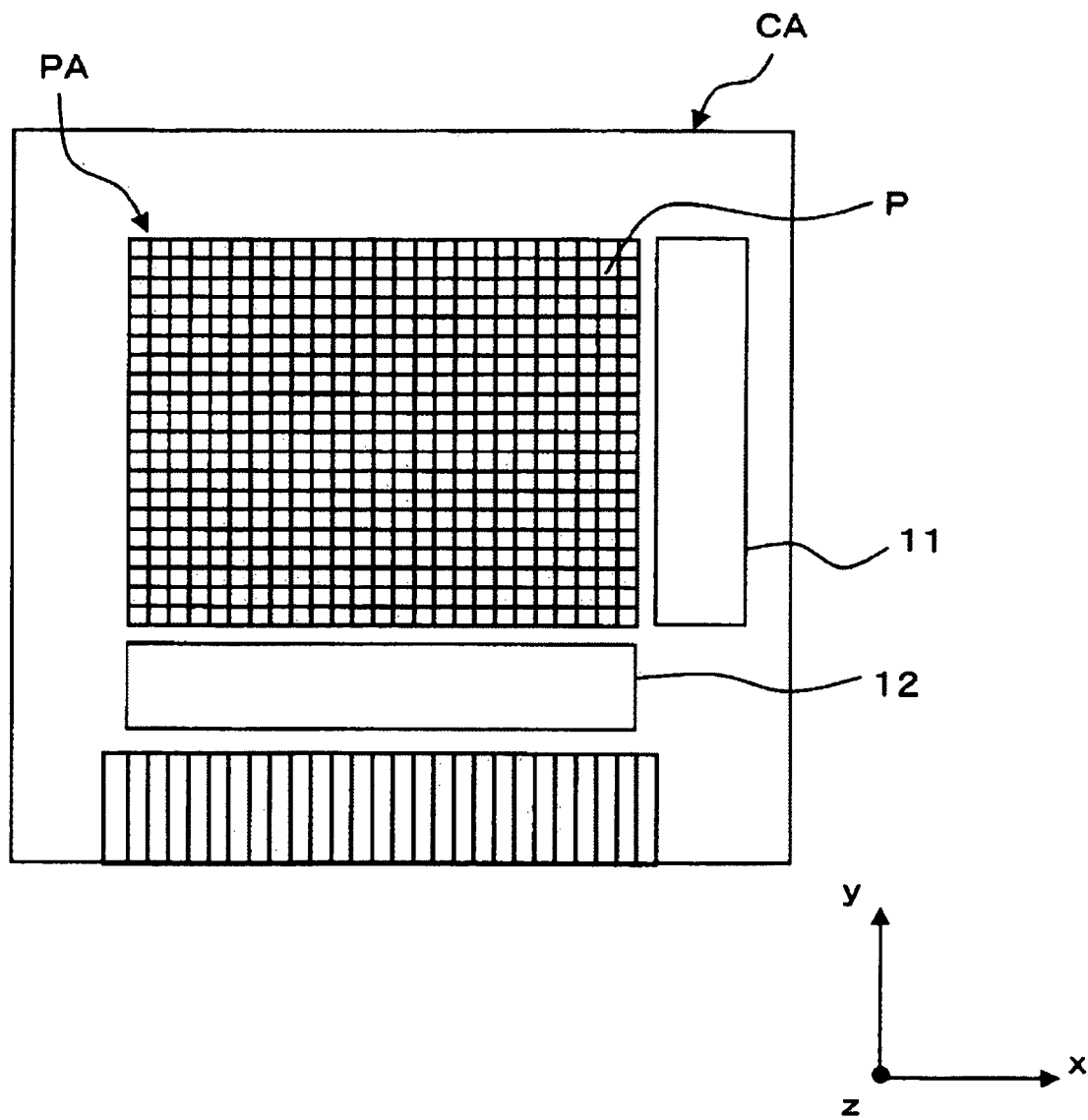
FIG. 2 is a plan view showing a liquid crystal panel according to the first embodiment of the present invention.

FIG. 2 is a plan view showing the liquid crystal panel 200 according to the first embodiment of the present invention.

As shown in FIG. 2, the liquid crystal panel 200 includes the display area PA and a peripheral area CA.

In the display area PA in the liquid crystal panel 200, a plurality of pixels P are disposed on the surface thereof. Specifically, in the display area PA, the plurality of pixels P are disposed in a matrix form in a horizontal direction x and a vertical direction y, to display an image. Although details will be described later, the pixel P includes the pixel switching element (not shown). Further, a plurality of touch sensor switches (not shown) that constitute the touch sensor correspond to the plurality of pixels P, respectively.

As shown in FIG. 2, the peripheral area CA in the liquid crystal panel 200 is disposed so as to surround the display area PA. In the peripheral area CA, a vertical drive circuit 11 and a horizontal drive circuit 12 are formed as shown in FIG. 2. For example, semiconductor elements formed in the same way as the pixel switching elements (not shown) constitute each of the circuits.

Further, the pixel switching elements corresponded to the pixels P are driven by the vertical drive circuit 11 and the horizontal drive circuit 12, thereby displaying an image on the display area PA.

In addition, the touch sensor (not shown) provided in the display area PA is driven by the vertical drive circuit and the horizontal drive circuit 12, thereby obtaining data. Then, the position detection portion 402 detects a position in the display area PA of the liquid crystal panel 200, which is touched by the detection target object such as the user's finger, based on the data obtained by the touch sensor.

(Detailed Structure of Liquid Crystal Panel)

Figure 3:
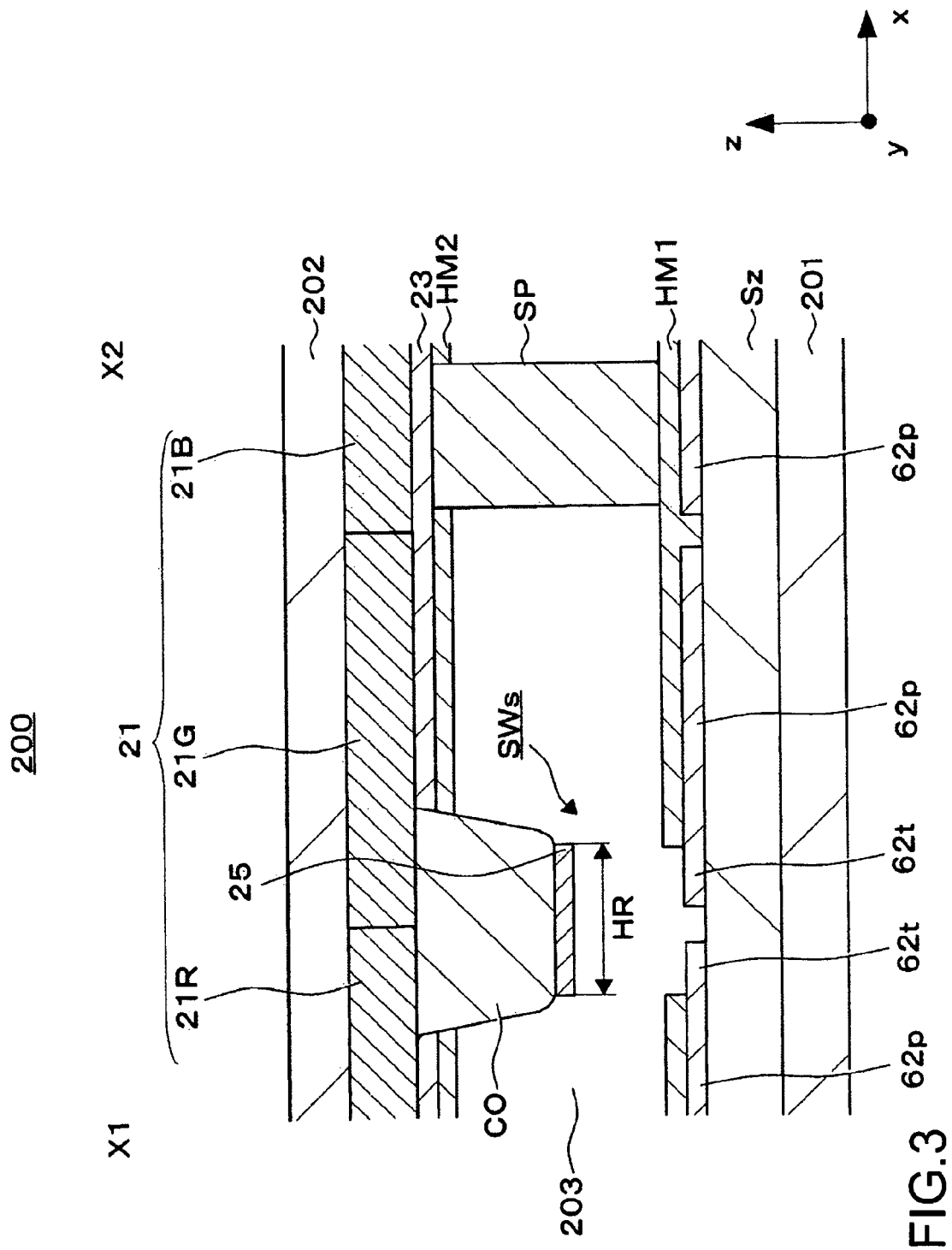
FIG. 3 is a diagram showing main components of the liquid crystal panel according to the first embodiment of the present invention.
Figure 4:
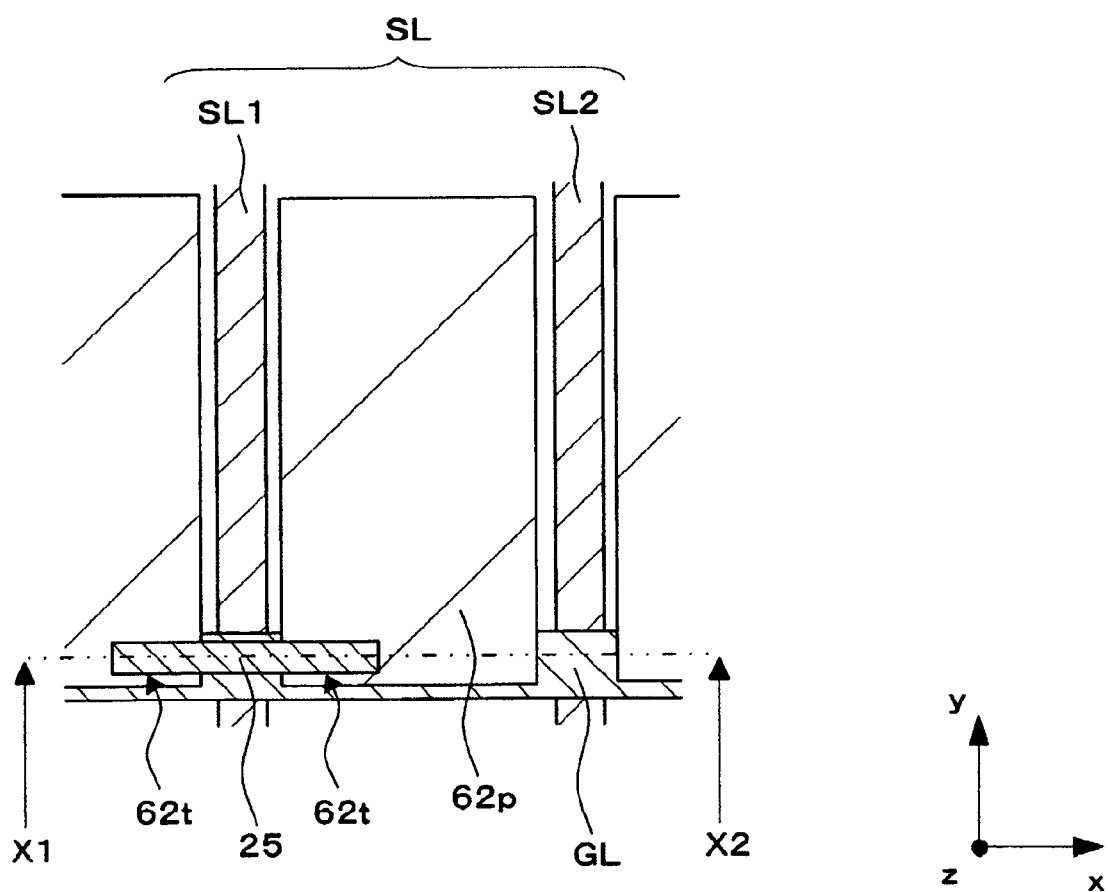
FIG. 4 is a diagram showing main components of the liquid crystal panel according to the first embodiment of the present invention.
Figure 5:
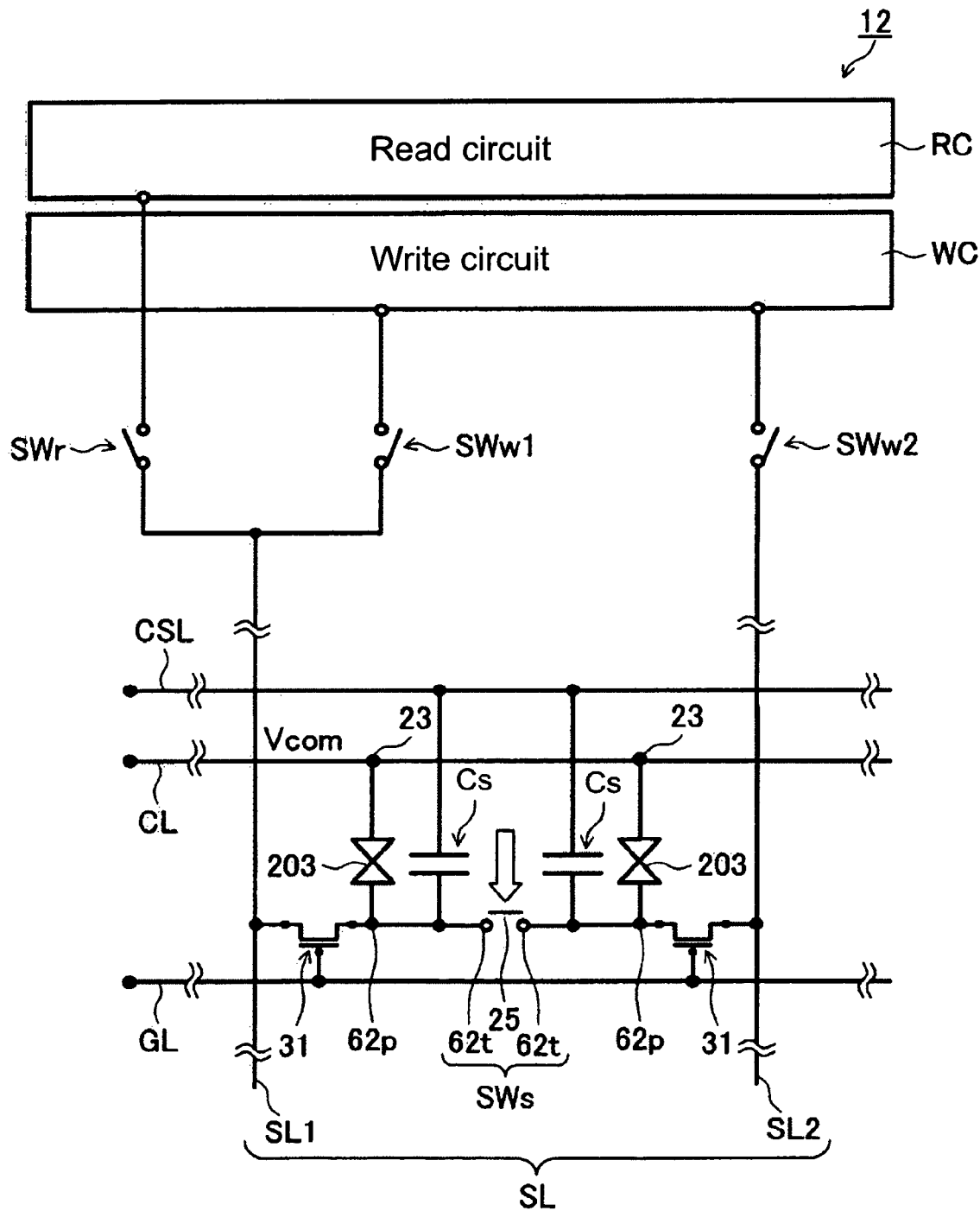
FIG. 5 is a diagram showing main components of the liquid crystal panel according to the first embodiment of the present invention.

FIGS. 3 to 5 are diagrams each showing main components of the liquid crystal panel 200 according to the first embodiment of the present invention.

Here, FIG. 3 is a cross-sectional view schematically showing an outline of the pixel P provided in the display area PA in the liquid crystal panel 200.

Further, FIG. 4 is a top view schematically showing the outline of the pixel P provided in the display area PA of the liquid crystal panel 200 in the first embodiment of the present invention. It should be noted that FIG. 3 shows the cross section taken along the line X1-X2 of FIG. 4, but the display of the components is simplified, when necessary, as a matter of convenience of illustration.

In addition, FIG. 5 is a circuit diagram showing the outline of the liquid crystal panel 200 according to the first embodiment of the present invention. FIG. 5 shows a part of the pixels P adjacent to each other.

As shown in FIG. 3, in the liquid crystal panel 200, a spacer SP is intervened between the TFT array substrate 201 and the opposed substrate 202 and bonded thereto by a sealing member (not shown). Between the TFT array substrate 201 and the opposed substrate 202, the liquid crystal layer 203 is included.

In this embodiment, as shown in FIG. 3, the liquid crystal panel 200 has a touch sensor switch SWs incorporated therein. The touch sensor switch SWs is constituted of touch electrodes 62t and 25 as shown in FIG. 3.

In the liquid crystal panel 200, the TFT array substrate 201 is an insulating substrate that causes light to pass therethrough and is made of glass, for example. As shown in FIG. 3, on the surface of the TFT array substrate 201, which is opposed to the opposed substrate 202, pixel electrodes 62p and the touch electrodes 62t that constitute the touch sensor switch SWs on one side are formed.

In the liquid crystal panel 200, like the TFT array substrate 201, the opposed substrate 202 is an insulating substrate that causes light to pass therethrough and is made of glass, for example. As shown in FIG. 3, on the surface of the opposed substrate 202, which is opposed to the TFT array substrate 201, a color filter layer 21, a common electrode 23, and the touch electrode 25 are formed. In this example, as shown in FIG. 3, a red filter layer 21R, a green filter layer 21G, and a blue filter layer 21B are structured as one set.

As shown in FIG. 4, the liquid crystal panel 200 includes gate lines GL and signal lines SL, in addition to the members shown in FIG. 3. Further, as shown in FIG. 5, the liquid crystal panel 200 includes pixel switching elements 31 and capacitors Cs. The gate lines GL, the signal lines SL, the pixel switching elements 31, and the capacitors Cs are provided on the TFT array substrate 201 that constitutes the liquid crystal panel 200, although not shown in FIG. 3.

The components provided to the TFT array substrate 201 will be described.

As shown in FIG. 3, in the TFT array substrate 201, the pixel electrodes 62p and touch electrodes 62t are provided through an interlayer insulating layer Sz on the surface of the TFT array substrate 201, which is opposed to the opposed substrate 202. The pixel electrodes 62p and the touch electrodes 62t each are a so-called transparent electrode and made of an ITO. Further, the pixel electrodes 62p and the touch electrodes 62t are formed integrally with each other and electrically connected to each other.

In this case, as shown in FIG. 4, the pixel electrodes 62p and the touch electrodes 62t each are formed in a rectangular pattern so that the pixel electrodes 62p and the touch electrodes 62t correspond to a plurality of areas sectioned by the gate lines GL and the signal lines SL on an x-y plane.

Specifically, as shown in FIG. 3, the pixel electrodes 62p are corresponded to the red filter layer 21R, the green filter layer 21G, and the blue filter layer 21B that constitute the color filter layer 21, respectively. That is, the pixel electrodes 62p are formed so as to correspond to each of three sub pixels that constitute the pixel P. In this case, as shown in FIG. 3, each of the pixel electrodes 62p is opposed to the common electrode 23 with the liquid crystal layer 203 being intervened therebetween. In addition, as shown in FIG. 5, each of the pixel electrodes 62p is electrically connected to one terminal of each of the pixel switching elements 31 and thus provides the potential to the liquid crystal layer 203.

On the other hand, as shown in FIG. 3, the touch electrodes 62t are corresponded to the red filter layer 21R and the green filter layer 21G that constitute the color filter layer 21, respectively, for example. That is, the touch electrodes 62t are formed so as to correspond to two sub pixels out of the three sub pixels that constitute the pixel P. In this case, as shown in FIG. 3, each of the two touch electrodes 62t is opposed to the touch electrode 25 provided on the opposed substrate 202 through the liquid crystal layer 203. Further, as shown in FIG. 4, the touch electrodes 62t are provided above the gate lines GL. Furthermore, as shown in FIG. 5, each of the touch electrodes 62t is electrically connected to a source of the pixel switching element 31.

In the TFT array substrate 201, the pixel switching elements 31 and the capacitor Cs are not shown in FIG. 3 but are provided in the interlayer insulating layer Sz on the surface of the TFT array substrate 201, which is opposed to the opposed substrate 202.

In this case, as shown in FIG. 5, the pixel switching element 31 is a transistor and is formed as a TFT that uses polysilicon, for example. As shown in FIG. 5, a gate of the pixel switching element 31 is electrically connected to the gate line GL. Further, a drain of the pixel switching element 31 is electrically connected to the signal line SL. In addition, a source of the pixel switching element 31 is electrically connected to the pixel electrode 62p and the touch electrode 62t.

Further, as shown in FIG. 5, one electrode of the capacitor Cs is electrically connected to the source of the pixel switching element 31, and the other electrode thereof is electrically connected to a capacitive line CSL.

In the TFT array substrate 201, the gate lines GL and the signal lines SL are not shown in FIG. 3 but are provided in the interlayer insulating layer Sz on the surface of the TFT array substrate 201, which is opposed to the opposed substrate 202.

Here, as shown in FIGS. 4 and 5, the gate lines GL are extended in the x direction on the x-y plane, and as shown in FIG. 5, the gate lines GL are electrically connected to each gate of the pixel switching elements 31. In addition, the gate lines GL are electrically connected to the vertical drive circuit 11 shown in FIG. 2, and a scanning signal Vgate is supplied from the vertical drive circuit 11 to the gate of the pixel switching element 31.

In addition, as shown in FIGS. 4 and 5, the signal lines SL are extended in the y direction on the x-y plane. Further, as shown in FIG. 5, the signal lines SL are electrically connected to each drain of the pixel switching elements 31. In addition, as shown in FIG. 5, the signal lines SL are electrically connected to the horizontal drive circuit 12.

In this embodiment, as shown in FIG. 5, the horizontal drive circuit 12 includes a write circuit WC and a read circuit RC. In addition, as shown in FIG. 5, the signal lines SL includes a first signal line SL1 and a second signal line SL2. The first signal line SL1 is connected to each of the write circuit WC and the read circuit RC, and the second signal line SL2 is connected to only the write circuit WC.

On the first signal line SL1 toward the write circuit WC, a switch SWw1 is provided. When the switch SWw1 is turned on, the first signal line SL1 is electrically connected with the write circuit WC. Further, on the first signal line SL1 toward the read circuit RC, a switch SWr is provided. When the switch SWr is turned on, the first signal line SL1 is electrically connected with the read circuit RC. The first signal line SL1 is connected to the sub pixel corresponding to the read filter layer 21R out of the color filter layer 21, for example.

On the other hand, on the second signal line SL2 toward the write circuit WC, a switch SWw2 is provided to electrically connect them. However, unlike the first signal line SL1, the second signal line SL2 is not electrically connected with the read circuit RC. For example, the second signal line SL2 is connected to the sub pixel corresponding to the green filter layer 21G out of the color filter layer 21.

It should be noted that in the pixel P, a third signal line (not shown) is provided so as to be connected to the sub pixel corresponding to the blue filter layer 21B out of the color filter layer 21, although not shown. Like the second signal line SL2, on the third signal line toward the write circuit WC, a switch is provided to electrically connect them.

In addition, as shown in FIG. 3, a liquid crystal alignment film HM1 is provided on the pixel electrode 62p on the TFT array substrate 201.

In this embodiment, each of the liquid crystal alignment film HM1 is formed so as to expose the surfaces of the touch electrodes 62t and is made of polyimide, for example.

The components provided to the opposed substrate 202 will be described.

As shown in FIG. 3, in the opposed substrate 202, the color filter layer 21 is formed on the surface of the opposed substrate 202, which is opposed to the TFT array substrate 201. In this case, the color filter layer 21 is provided for each of the pixel P with the color filter layer 21 including the red filter layer 21R, the green filter layer 21G, and the blue filter layer 21B as one set. The respective colors are aligned in the x direction. The color filter layer 21 is made of a polyimide resin containing a colorant such as a pigment and a dye, for example. In the color filter layer 21, white light emitted from the backlight 300 is colored and caused to exit the color filter layer 21.

As shown in FIG. 3, in the opposed substrate 202, the common electrode 23 is formed on the side of the opposed substrate 202, which is opposed on the TFT array substrate 201. The common electrode 23 is formed so as to cover the color filter layer 21. The common electrode 23 is a so-called transparent electrode and is formed of the ITO, for example. Further, as shown in FIG. 5, each of the common electrodes 23 is electrically connected to a Vcom line CL, and a common potential is applied thereto. That is, in the display area PA, the common electrode 23 is opposed to the plurality of pixel electrodes 62p that are corresponded to the plurality of pixels P, and functions as an electrode common in the pixels P.

Further, as shown in FIGS. 3 and 4, a liquid crystal alignment film HM2 is provided on the common electrode 23. In this case, the liquid crystal alignment film HM2 is formed so as to cover an entire surface of the common electrode 23. For example, the liquid crystal alignment film HM2 is obtained through film formation of polyimide by a spin coating method. On the surface of a convex portion CO, the polyimide film is not formed, and therefore the surface of the touch electrode 25 is exposed.

As shown in FIG. 3, in the opposed substrate 202, the touch electrode 25 is formed on the side of the opposed substrate 202, which is opposed to the TFT array substrate 201. Further, as shown in FIG. 5, the touch electrode 25 is brought into contact with the two touch electrodes 62t provided so as to be adjacent to each other on the TFT array substrate 201 side, thereby electrically connecting the touch electrodes 62t. That is, when the liquid crystal panel 200 is deformed by the external pressure, the touch electrode 25 is brought into contact with the two touch electrodes 62t and electrically connects the two touch electrodes 62t.

In this embodiment, the touch electrode 25 is formed on the convex portion CO as shown in FIG. 3.

As shown in FIG. 3, on the surface of the opposed substrate 202, which is opposed to the TFT array substrate 201, the convex portion CO is protruded in the convex shape toward the TFT array substrate 201. In this case, as shown in FIG. 3, the convex portion CO is formed so as to be shorter than the length of the spacer SP that maintains a cell gap.

In addition, as shown in FIG. 3, the convex portion CO is formed in a forward tapered shape. That is, the width of the convex portion CO defined in the x direction is gradually reduced toward the TFT array substrate 201 from the opposed substrate 202. Further, the convex portion CO is an elastic body and is made of an acrylic resin, a novolac resin, or the like.

In addition, on a top surface of the convex portion CO, which is opposed to the TFT array substrate 201, a flat area HR that is flat along the x-y plane is formed.

Further, the touch electrode 25 is provided in the flat area HR on the convex portion CO as an isolated pattern.

The liquid crystal layer 203 will be described.

As shown in FIG. 3, the liquid crystal layer 203 is sandwiched between the TFT array substrate 201 and the opposed substrate 202.

In this case, in the liquid crystal layer 203, liquid crystal molecules (not shown) are aligned by the liquid crystal alignment film HM1 formed on the TFT array substrate 201 and the liquid crystal alignment film HM2 formed on the opposed substrate 202. For example, the liquid crystal layer 203 is formed so that the liquid crystal molecules are vertically aligned. That is, the liquid crystal layer 203 is formed so that a liquid crystal display mode is set to a VA (vertical align) mode. In addition to this, the liquid crystal layer 203 may be formed so that the liquid crystal display mode is set to a TN (twisted nematic) mode or an ECB (electrically controlled birefringence) mode.

(Operation)

Hereinafter, in the Liquid Crystal Display Apparatus 100, operations at a time when the position in the display area PA of the liquid crystal panel 200, which is touched by the detection target object such as the user's finger, is detected will be described.

For detection of the touched position, first, a precharging is performed.

In this case, the control portion 401 controls the respective components so that the precharging is performed as follows.

Specifically, as shown in FIG. 5, a voltage (xVcom) having an opposite polarity to the voltage (Vcom) applied to the Vcom line CL is applied to the first signal line SL1 in advance through the switch SWw1, for example. In addition, the voltage having the same polarity as the voltage (Vcom) applied to the Vcom line CL is applied to the second signal line SL2 in advance through the switch SWw2. After that, the switch SWw1 on the first signal line SL1 is tuned off, and the first signal line SL1 is brought into an electrically floating state.

Next, in the liquid crystal panel 200, the touched position that is touched by the detection target object is detected.

In this case, the control portion 401 controls the respective components so that the following detection operation of the touched position is carried out.

Specifically, after the precharging described above is performed, a signal is supplied so that the gate voltage of the gate line GL is shifted to an active level (in this example, high level), thereby causing the pixel switching elements 31 connected to the two touch electrodes 62t to be on. Then, the switch SWr connected to the first signal line SL1 is turned on, and a sensor signal is output from the first signal line SL1 to the read circuit RC. Further, based on the sensor signal read in the read circuit RC, the touched position is detected.

Specifically, in a case where the detection target object touches the liquid crystal panel 200, and the touch electrode 25 is brought into contact with the two touch electrodes 62t, the touch sensor switch SWs is brought into an on state as can be seen from FIG. 5. In this case, the two touch electrodes 62t are electrically connected and short-circuited. As a result, a current flows from the second signal line SL2 to the first signal line SL1 through the touch sensor switch SWs, the first and second signal lines SL1 and SL2 having been subjected to the precharging operation. As a result, the potential of the first signal line SL1 in the floating state is changed.

On the other hand, in a case where the external pressure is not applied to the liquid crystal panel 200, and the touch electrode 25 is not brought into contact with the two touch electrodes 62t to cause the touch sensor switch SWs to be in the off state, as shown in FIG. 5, the two touch electrodes 62t are not electrically short-circuited unlike the above case. Therefore, a current does not flow between the first signal line SL1 and the second signal line SL2, and thus the potential of the first signal line SL1 in the floating state is not changed.

As described above, depending on whether the touching by the detection target object is caused, the potential of the first signal line SL1 is changed. Therefore, based on the potential of the first signal line SL1, the position detection position 402 detects the touched position by the detection target object in the liquid crystal panel 200.

In the liquid crystal display apparatus 100, an image display operation is performed in addition to the above-mentioned position detection operation. In this case, the position detection operation and the image display operation are alternately repeatedly performed.

At a time when the image display is performed, the scanning signal is supplied from the gate line GL to the gate of the pixel switching element 31, and the switching operation of the pixel switching element 31 is controlled. Further, an image signal is written to the pixel electrode 62p from the write circuit WC through the write switches SWw1 and SWw2, the signal line SL, and the pixel switching element 31 in succession, thereby performing the image display.

FIGS. 6A and 6B each are a cross-sectional view showing a state where the detection target object F touches the display area PA of the liquid crystal panel 200 in the liquid crystal display apparatus 100 according to the first embodiment of the present invention. In FIG. 6, main components are shown, and some components are not shown.

In a case where the detection target object touches the side of the opposed substrate 202, which is opposite to the liquid crystal layer 203, and the opposed substrate 202 is pressed, the opposed substrate 202 is deformed and moved to the TFT array substrate 201 side as shown in FIGS. 6A and 6B. At this time, along with the deformation of the opposed substrate 202, the touch electrode 25 provided on the surface of the opposed substrate 202 on the side of the liquid crystal layer 203 is approached toward the TFT array substrate 201. Then, the touch electrode 25 is brought into contact with the two touch electrodes 62t provided on the TFT array substrate 201. In this way, the touch electrode 25 provided on the opposed substrate 202 is brought into contact with the touch electrodes 62t provided on the TFT array substrate 201, thereby causing the touch sensor switch SWs to be on.

That is, in the liquid crystal panel 200, when the touch operation is performed by the touching pressure larger than a pressure at the start of the operation, the sensor gap is reduced, and thus the touch electrodes 25 and 62t provided on the substrates 201 and 202, respectively, are brought into contact with each other, with the result that the touch sensor switch SWs is turned on.

As shown in FIG. 6B, when the touch electrode 25 provided on the upper side is brought into contact with the two touch electrodes 62t provided on the lower side, the convex portion CO is deformed by the pressure.

In this situation, in related art, as shown in FIG. 17, the deformation of the convex portion 211J may cause the touch electrode 212J to be broken by the stress in the direction of the x-y plane.

However, in this embodiment, as shown in FIG. 6, the touch electrode 25 is formed in the flat area HR on the convex portion CO as the isolated pattern.

Therefore, in this embodiment, the touch electrode 25 formed on the convex portion CO can be prevented from being broken.

(Conclusion)

As Described Above, in this Embodiment, the Convex portion CO is formed on the x-y plane surface of the opposed substrate 202, which is opposed to the TFT array substrate 201. In this case, the flat area HR is formed on the top surface of the convex portion CO, which is opposed to the TFT array substrate 201. Further, the touch electrode 25 that constitutes the touch sensor switch SWs is formed in the flat area HR on the convex portion CO as the isolated pattern. Accordingly, as described above, the touch electrode 25 can be prevented from being broken even when repeatedly used, with the result that the reliability of the apparatus can be increased.

In this embodiment, the touch sensor switch SWs is formed so that the one touch electrode 25 is brought into contact with the two touch electrodes 62t when the liquid crystal panel 200 is deformed by the external pressure, and the two touch electrodes 62t are electrically connected with each other.

In other words, the touch sensor switch SWs of this embodiment is not a one-point connection type but a two-point connection type. In the case of the one-point connection type, if a conductive foreign matter gets on the one connection position to cause a constantly short-circuited state, it may be difficult to perform the position detection. However, the touch sensor switch SWs of this embodiment is the two-point connection type. Therefore, even when the short-circuited state is caused between the one touch electrode 25 provided on the upper side and one of the two touch electrodes 62t on the lower side, the two touch electrodes 62t can be maintained to be opened, as long as the external pressure is not applied.

Accordingly, in this embodiment, the position detection can be appropriately carried out.

It should be noted that in this embodiment, the convex portion CO has the tapered shape, and it is desirable to set the tapered angle θ to 70 degrees or less. In a case where the tapered angle exceeds the 70 degrees, the amount of the deformation of the convex portion CO is increased, which may cause a problem of breaking the touch electrode 25.

FIG. 7 is a diagram showing a relationship between the tapered angle θ of the convex portion and the amount of the deformation x (m) in the first embodiment of the present invention. Here, FIG. 7 shows a result of a simulation with respect to the amount of the deformation of the convex portion CO by using ANSYS that is an FEM structural analysis simulator. In this simulation, a Young's modulus of 3.5 GPa and a Poisson's ratio of 0.38 are set as center conditions of the convex portion CO. In addition, a size of a bottom surface of the convex portion CO is set to 35 μm×15 μm, and a height thereof is set to 2.5 μm. Further, a distance by which an upper end portion of the convex portion is deformed is regarded as the amount of the deformation, to perform the simulation and obtained the simulation result. In addition, in FIG. 7, the "pressure" refers to a pressure applied in the simulation.

Further, FIGS. 8A and 8B are cross-sectional diagrams each showing the state where the convex portion CO is deformed depending on the tapered angle θ in the first embodiment of the present invention.

As the result of the simulation mentioned above, as shown in FIG. 7, when the tapered angle θ was 68 degrees, the smallest amount of the deformation x (m) was obtained. When the tapered angle θ was 78 to 90 degrees, the amount of the deformation x (m) was large. In this case, the following result was obtained. That is, a state where the side surface of the convex portion was laterally deformed shifted to a state where the top surface thereof was depressed while the tapered angle θ of the convex portion CO was reduced from 90 degrees to 45 degrees.

Specifically, in a case where the convex portion does not have the tapered shape (tapered angle θ=90 degrees) as shown in FIG. 8A, the side surface of the convex portion was laterally deformed by the external pressure. In this case, in the bottom portion of the convex portion CO, only slight deformation was caused, but the top portion thereof was deformed toward outside to a large extent. As described above, in the case where the convex portion does not have the tapered shape, a tensile stress that causes the lateral deformation is applied to the touch electrode 25 formed on the top surface of the convex portion CO, which may damage the touch electrode 25.

On the other hand, as shown in FIG. 8B, in the state where the convex portion has the tapered shape, it is difficult for the convex portion to be laterally deformed by the external pressure, and the top surface can be deformed so as to be depressed. In particular, in the case where the tapered angle θ of the convex portion CO is set to 70 degrees or less, the top surface thereof can be easily deformed so as to be depressed. Thus, as shown in FIG. 7, the amount of the deformation of the convex portion CO can be suppressed. Therefore, in this case, the tensile stress that causes the lateral deformation is hardly applied to the touch electrode 25 formed on the top surface of the convex portion CO, with the result that the damage can be effectively prevented.

In addition, as shown in FIG. 8B, it is desirable to form the touch electrode 25 in an area that is inwardly separated from a tapered area TP by a distance equal to or longer than a width L1 of the tapered area TP of the convex portion CO. That is, it is desirable that a distance L2 between an end portion of the touch electrode 25 and an inflection point at which the top surface of the convex portion CO is curved to the side surface that is inclined in the tapered manner is set to be equal to or longer than the width L1 between the inflection point and a point of the end portion of the side surface on the opposed substrate 202 side. By this setting, the top surface of the convex portion CO is depressed by the external pressure in this area. Thus, the stress does not concentrate on the touch electrode 25 formed in this area, with the result that the damage of the touch electrode 25 can be prevented.

In addition to this, it is desirable to form the convex potion CO so that the Young's modulus falls within the range of 1 to 5 GPa, and the Poisson's ratio falls within the range of 0.36 to 0.40.

The simulation was performed with Poisson's ratio of 0.38 being set as the center condition of the convex portion CO in the same way as above. In the range of the Young's modulus described above, the amount of the deformation was not changed. Further, the simulation was performed with the Young's modulus of 3.5 GPa being set as the center condition of the convex portion CO in the same way as above. In the range of the Poisson's ratio described above, the amount of the deformation was not changed. For this reason, the ranges described above are desirable.

2. Second Embodiment

Case where FFS Mode is Employed

Hereinafter, a second embodiment of the present invention will be described.

(Detailed Structure of Liquid Crystal Panel)

A detailed structure of a liquid crystal panel 200b of this embodiment will be described.

Figure 9:
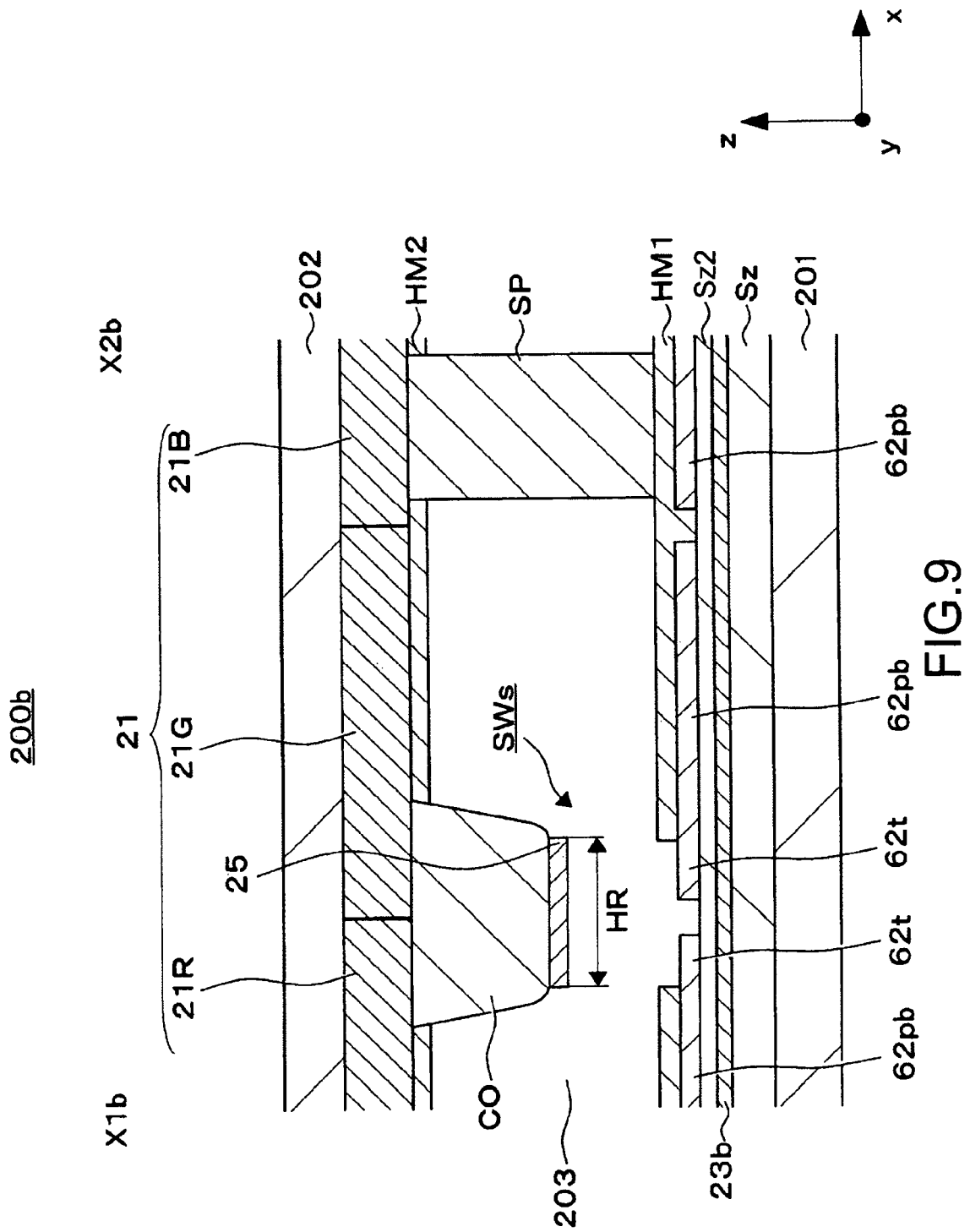
FIG. 9 is a diagram showing main components of a liquid crystal panel according to a second embodiment of the present invention.
Figure 10:
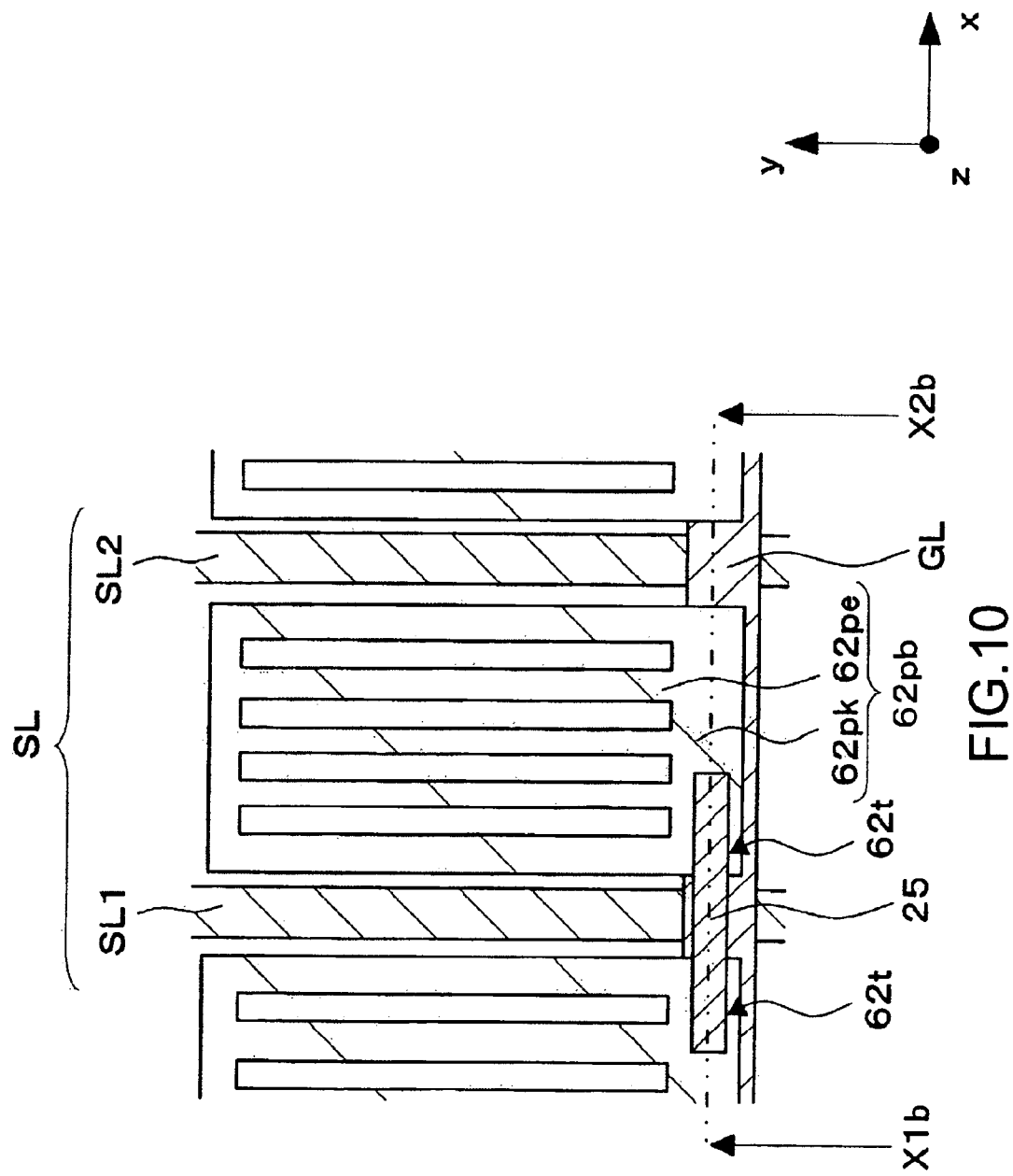
FIG. 10 is a diagram showing main components of the liquid crystal panel according to a second embodiment of the present invention.

FIGS. 9 and 10 are diagrams each showing main components of the liquid crystal panel 200b according to the second embodiment of the present invention.

Here, FIG. 9 is a cross-sectional view schematically showing an outline of the pixel P provided on the display area PA in the liquid crystal panel 200b according to the second embodiment of the present invention.

Further, FIG. 10 is a top view schematically showing the outline of the pixel P provided on the display area PA in the liquid crystal panel 200b in the second embodiment of the present invention. It should be noted that FIG. 9 shows the cross-sectional view taken along the line X1b-X2b of FIG. 10, but the display of the components is simplified, when necessary, as a matter of convenience of illustration.

As shown in FIGS. 9 and 10, in the liquid crystal panel 200b, pixel electrodes 62pb and the common electrode 23b are formed in accordance with an FFS (fringe field switching) mode. The second embodiment is different from the first embodiment in this point and a point related thereto. A description on the same points will be omitted.

As shown in FIGS. 9 and 10, in this embodiment, the pixel electrodes 62pb and the common electrode 23b are provided on the TFT array substrate 201.

As shown in FIG. 9, the pixel electrodes 62pb are formed on the side of the TFT array substrate 201, which is opposed to the opposed substrate 202.

In this case, as shown in FIG. 9, the pixel electrodes 62pb are formed on an interlayer insulating layer Sz2 made of an insulating material so as to cover the common electrode 23b on the TFT array substrate 201. The interlayer insulating layer Sz2 is formed as a silicon nitride film, for example.

In this embodiment, the liquid crystal panel 200b in the FFS mode is used. Therefore, the pixel electrodes 62pb are subjected to a patterning process into a comb-like shape on the x-y plane.

Specifically, as shown in FIG. 10, the pixel electrode 62pb includes base portions 62pk and branch portions 62pe.

In the pixel electrode 62pb, the base portion 62pk is extended in the x direction as shown in FIG. 10. In this case, as shown in FIG. 10, the two base portions 62pk are disposed in the y direction in parallel to each other.

Further, as shown in FIG. 10, in the pixel electrode 62pb, the branch portions 62pe are connected to the base portions 62pk and extended in the y direction. The plurality of branch portions 62pe are disposed in the x direction at intervals as shown in FIG. 10. Further, the plurality of the branch portions 62pe each are connected to the base portions 62pk and are extended and arranged in parallel to each other.

As shown in FIG. 9, the pixel electrodes 62pb are formed integrally with the touch electrodes 62t as in the case of the first embodiment.

As shown in FIG. 9, the common electrode 23b is formed on the side of the TFT array substrate 201, which is opposed to the opposed substrate 202. In this case, the common electrode 23b is formed on the interlayer insulating layer Sz formed on the TFT array substrate 201. In addition, the common electrode 23b is opposed to the plurality of pixel electrodes 62pb so as to be corresponded to the plurality of pixels P through the interlayer insulating layer Sz2.

(Conclusion)

As Described Above, in this Embodiment, the Liquid crystal panel 200b in the FFS mode is used. As shown in FIG. 9, as in the case of the first embodiment, the convex portion CO is formed on the x-y plane on the surface of the opposed substrate 202, which is opposed to the TFT array substrate 201. In this case, as shown in FIG. 9, the flat area HR is provided on the top surface of the convex portion CO, which is opposed to the TFT array substrate 201. In addition, the touch electrode 25 that constitutes the touch sensor switch SWs is formed in the flat area HR on the convex portion CO as the isolated pattern. Therefore, according to this embodiment, the touch electrode 25 can be prevented from being broken as in the case of the first embodiment, with the result that the reliability of the apparatus can be improved.

It should be noted that in a case where a mode of applying a lateral electric field to the liquid crystal layer 203, such as an IPS (in-plane-switching) mode, is applied, the same effect as above can be obtained.

3. Third Embodiment

Case where Suspended Column is Provided

Hereinafter, a third embodiment of the present invention will be described.

(Detailed Structure of Liquid Crystal Panel)

A detailed description will be given on a liquid crystal panel 200c of this embodiment.

Figure 11:
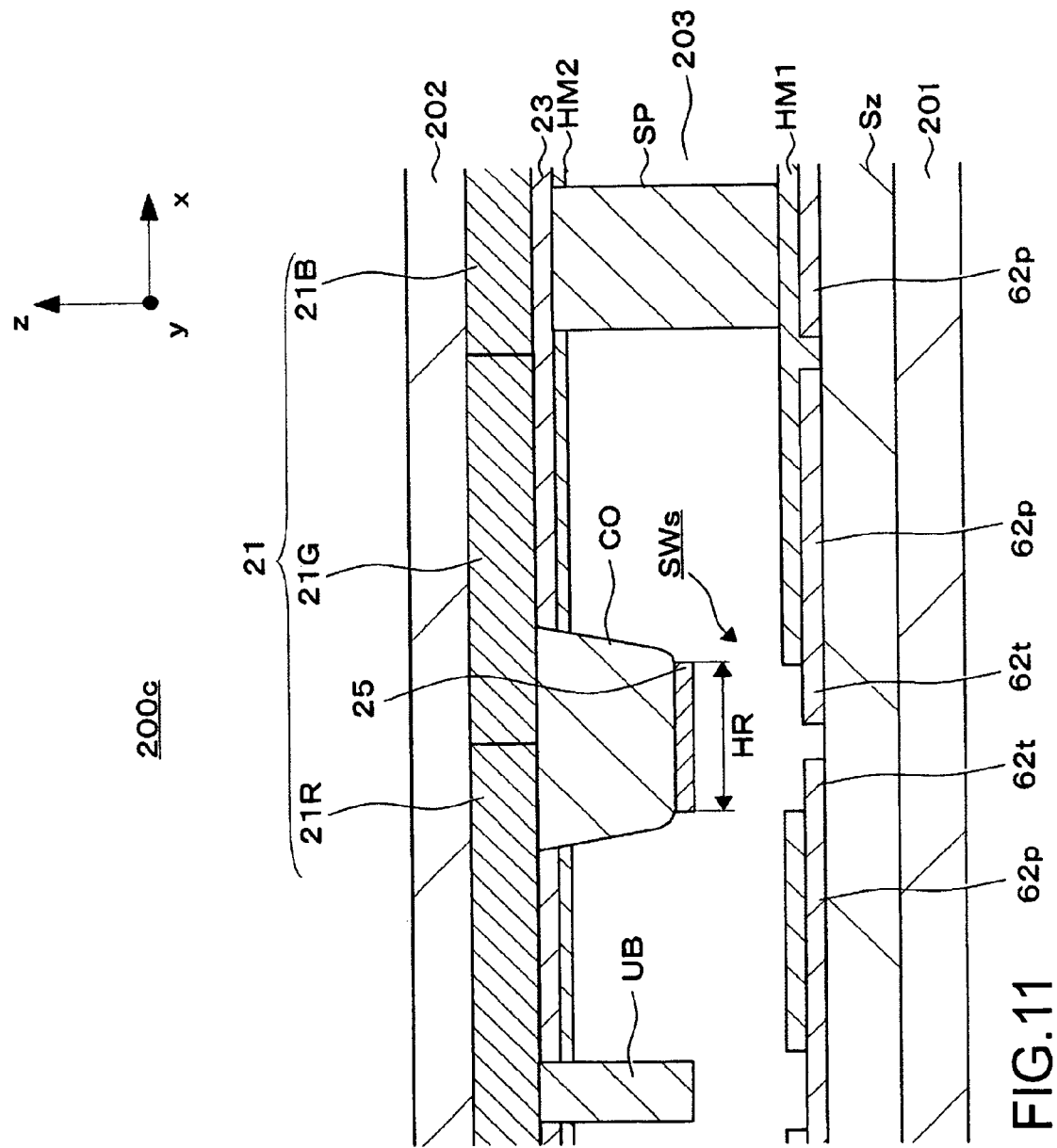
FIG. 11 is a diagram showing main components of a liquid crystal panel according to a third embodiment of the present invention.

FIG. 11 shows main components of the liquid crystal panel 200c according to the third embodiment of the present invention. FIG. 11 is a cross-sectional view schematically showing an outline of the liquid crystal panel 200c according to the third embodiment of the present invention.

As shown in FIG. 11, to the liquid crystal panel 200c of this embodiment, a suspended column UB is provided. The third embodiment is different from the first embodiment in this point and a point related thereto. A description on the same points as the first embodiment will be omitted.

As shown in FIG. 11, the suspended column UB is provided on the opposed substrate 202. The suspended column UB is formed on the side of the opposed substrate 202, which is opposed to the TFT array substrate 201, as shown in FIG. 11.

In this case, the suspended column UB is formed on the color filter layer 21 as in the case of the convex potion CO, as shown in FIG. 11. For example, like the convex portion CO, the suspended column UB is formed by performing the patterning process on a photosensitive resin. In this embodiment, the suspended column UB is formed so that a height thereof is equal to the total height of the convex portion CO and the touch electrode 25, for example.

(Conclusion)

As Described Above, in this Embodiment, the suspended column UB is formed on the x-y plane of the surface of the opposed substrate 202, which is opposed to the TFT array substrate 201, so as to be protruded in a convex shape. In this case, when the external pressure is applied, the suspended column UB, in addition to the touch electrode 25 formed on the convex portion CO, is brought into contact with the member on the TFT array substrate 201 side. Therefore, the stress by the external pressure is dispersed.

As a result, in this embodiment, the stress can be prevented from concentrating on the touch sensor switch SWs, and thus its durability in the repeated use can be improved.

4. Others

The present invention is not limited to the above embodiments. Various modifications of the present invention can be adopted.

For example, in the above embodiments, the case where the convex portion CO is provided on the opposed substrate 202 side, but the present invention is not limited to this. In a case where the convex portion CO is provided on the TFT array substrate 201 side, the same effect can be obtained.

Further, in the above embodiments, the touch electrodes 62t are formed integrally with the pixel electrodes 62p, but the present invention is not limited to this. The touch electrodes 62t can be separately formed from the pixel electrodes 62p. In this case, a TFT (not shown) may be provided in addition to the pixel switching elements 31, and the TFT may be operated independently of the pixel switching elements 31, thereby forming a circuit so that the detection operation of the touch sensor is controlled.

Further, in the above embodiments, the touch electrodes 25 and 62t are formed as the transparent electrodes, but the present invention is not limited to this. For example, the touch electrodes 25 and 62t may be formed of metal materials that are not transparent, such as Al and Mo.

In the above embodiments, the transmissive liquid crystal panel is described, but the present invention is not limited to this. The present invention may be applied to a reflective liquid crystal panel or a semi-transmissive liquid crystal panel in which both the transmissive type and the reflective type can be used.

Further, the present invention may be applied to a display panel such as an organic EL display, in addition to the liquid crystal panel.

Further, the present invention may be applied to a resistive touch sensor that is externally provided to the apparatus, in addition to the case of being incorporated in the display panel.

In addition, the liquid crystal display apparatus 100 of the above embodiments can be applied as a part of various electronic apparatuses.

FIGS. 12 to 16 are diagrams each showing an electronic apparatus to which the liquid crystal display apparatus 100 according to the embodiments of the present invention is applied.

Figure 12:
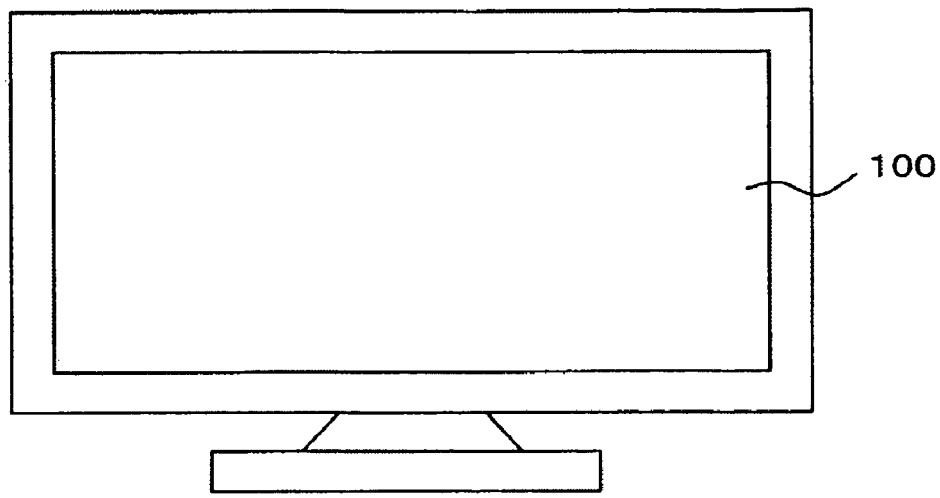
FIG. 12 is a diagram showing an electronic apparatus to which the liquid crystal display apparatus according to the embodiments of the present invention is applied.

As shown in FIG. 12, to a television that receives and displays television broadcasts, the liquid crystal display apparatus 100 can be applied as a display apparatus that displays the received image on a display screen and to which an operation instruction is input by an operator.

Figure 13:
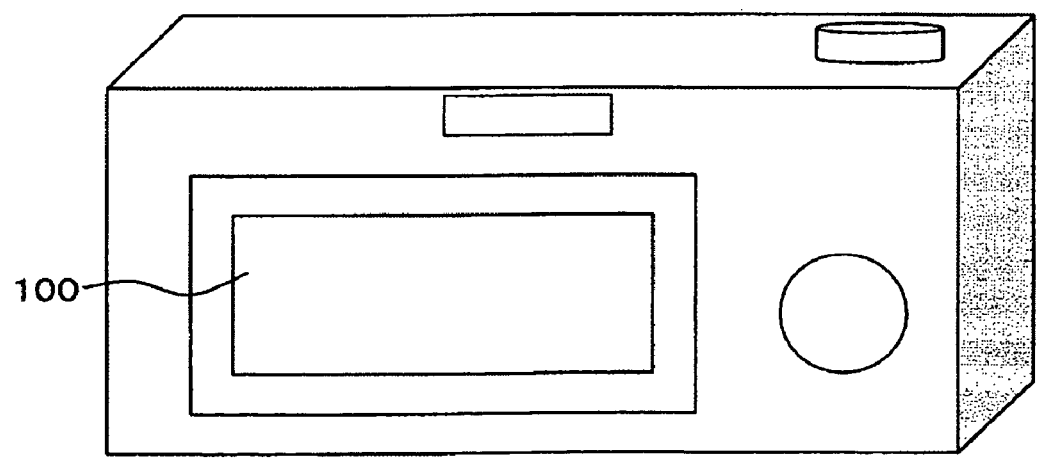
FIG. 13 is a diagram showing an electronic apparatus to which the liquid crystal display apparatus according to the embodiments of the present invention is applied.

Further, as shown in FIG. 13, to a digital still camera, the liquid crystal display apparatus 100 can be applied as a display apparatus that displays an image such as a taken image on a display screen and to which an operation instruction is input by an operator.

Figure 14:
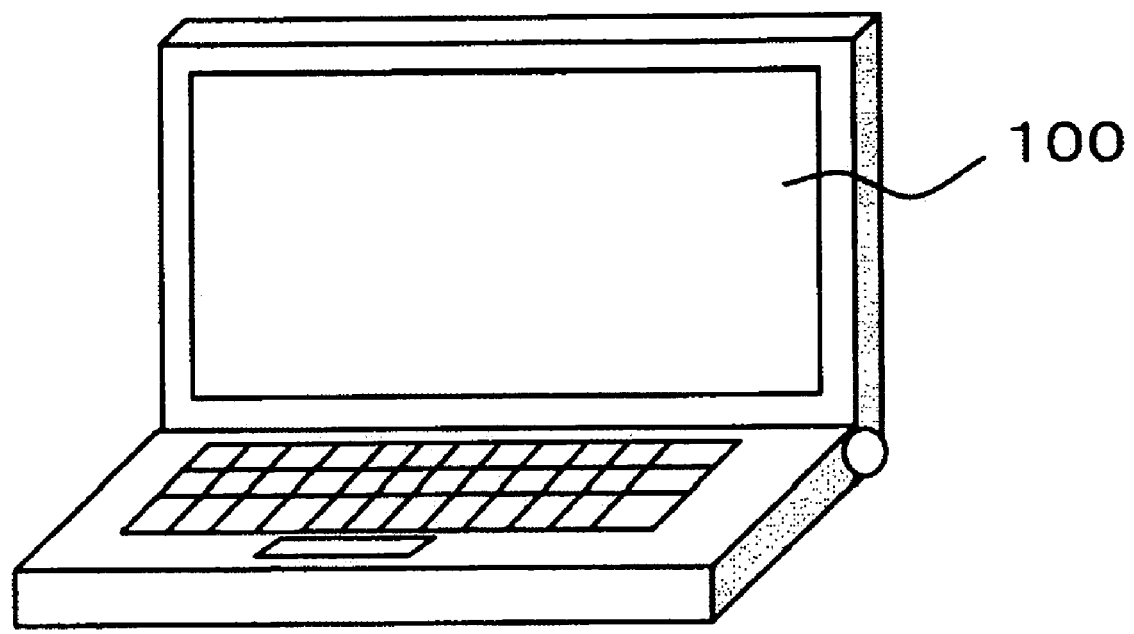
FIG. 14 is a diagram showing an electronic apparatus to which the liquid crystal display apparatus according to the embodiments of the present invention is applied.

Further, as shown in FIG. 14, to a laptop personal computer, the liquid crystal display apparatus 100 can be applied as a display apparatus that displays an operation image or the like on a display screen and to which an operation instruction is input by an operator.

Figure 15:
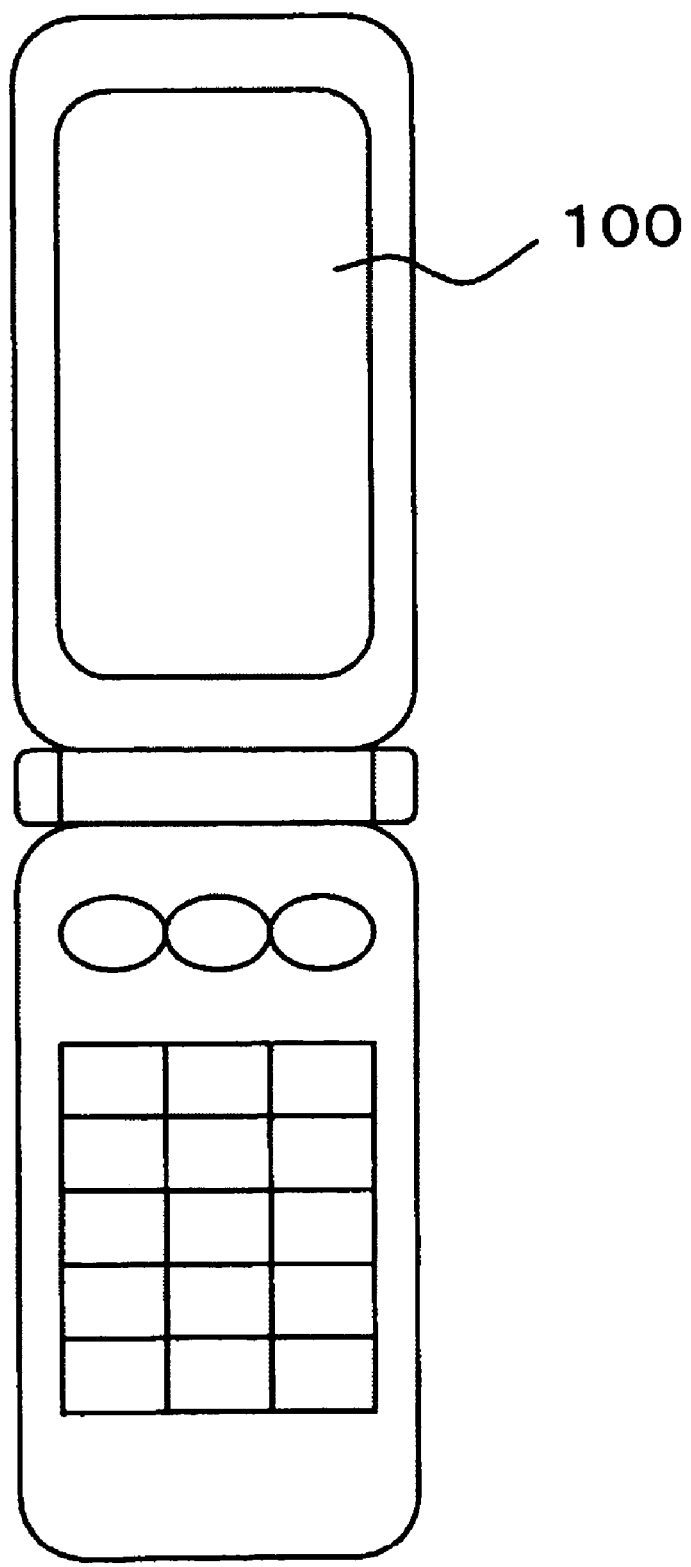
FIG. 15 is a diagram showing an electronic apparatus to which the liquid crystal display apparatus according to the embodiments of the present invention is applied.

Further, as shown in FIG. 15, to a cellular phone terminal, the liquid crystal display apparatus 100 can be applied as a display apparatus that displays an operation image or the like on a display screen and to which an operation instruction is input by an operator.

Figure 16:
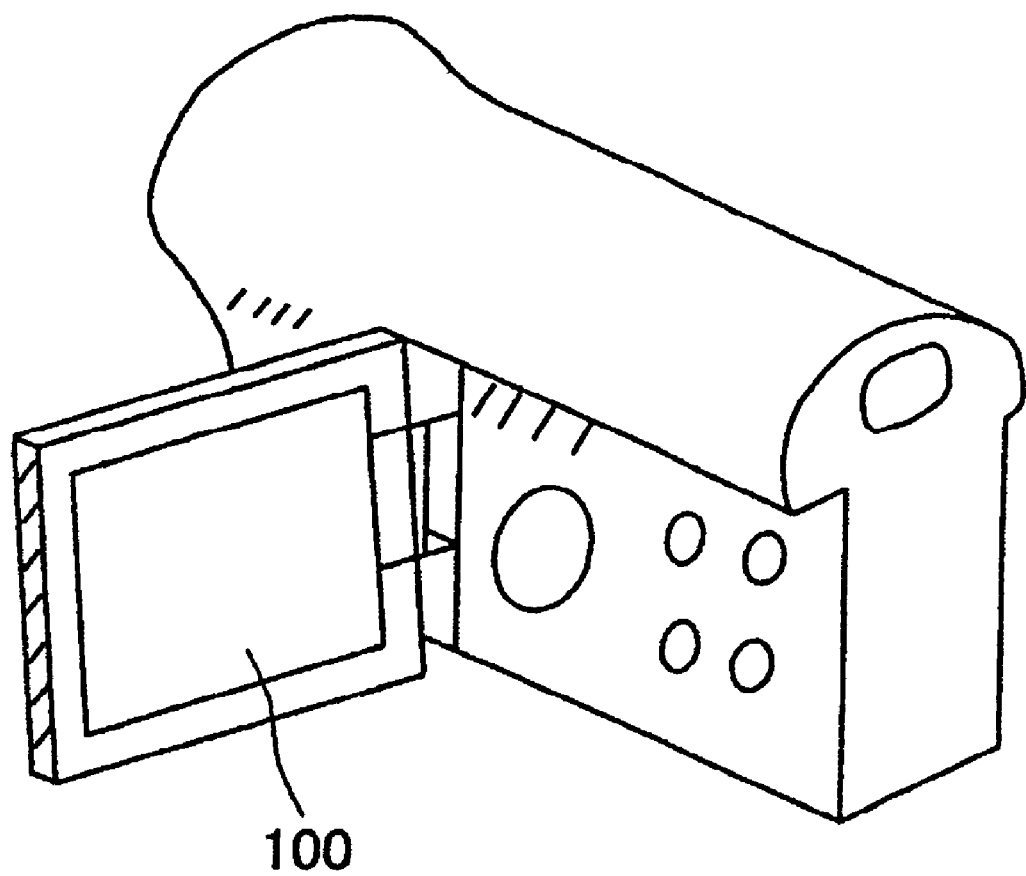
FIG. 16 is a diagram showing an electronic apparatus to which the liquid crystal display apparatus according to the embodiments of the present invention is applied.

Further, as shown in FIG. 16, to a video camera, the liquid crystal display apparatus 100 can be applied as a display apparatus that displays an operation image or the like on a display screen and to which an operation instruction is input by an operator.

It should be noted that in the above embodiments, the touch electrode 25 corresponds to a first touch electrode of the present invention, and the touch electrode 62t corresponds to a second touch electrode of the present invention. Further, in the above embodiments, the liquid crystal display apparatus 100 corresponds to a display apparatus or an information input apparatus of the present invention. Further, in the above embodiments, the liquid crystal panels 200, 200b, and 200c correspond to a display panel or a liquid crystal panel of the present invention. Further, in the above embodiments, the TFT array substrate 201 corresponds to a second substrate of the present invention, and the opposed substrate 202 corresponds to a first substrate of the present invention. Further, in the above embodiments, the liquid crystal layer 203 corresponds to a liquid crystal layer of the present invention. Further, in the above embodiments, the convex potion CO corresponds to a convex potion of the present invention, and the display area PA corresponds to a display area of the present invention. Further, in the above embodiments, the touch sensor switch SWs corresponds to a touch sensor switch of the present invention, and the suspended column UB corresponds to a suspended column portion of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus, comprising:
a display panel including a first substrate, a second substrate, and a touch sensor switch incorporated therein, the second substrate being opposed to the first substrate at an interval, the touch sensor switch being disposed in a display area that displays an image,
wherein the touch sensor switch includes
a first touch electrode provided on a surface of the first substrate, the surface being opposed to the second substrate, and
a second touch electrode provided on a surface of the second substrate, the surface being opposed to the first substrate, the first touch electrode and the second touch electrode having an interval therebetween,
wherein the touch sensor switch has a structure in which the first touch electrode and the second touch electrode are brought into contact with each other when the display panel is deformed by an external pressure,
wherein the first substrate includes a convex portion that protrudes in a convex shape toward the second substrate, the convex portion being formed on the surface opposed to the second substrate,
wherein the convex portion has a top surface opposed to the second substrate and includes a flat area formed on the top surface along the surface of the second substrate,
wherein the first touch electrode is formed in the flat area on the convex portion as an isolated pattern,
wherein the convex portion is formed in a forward tapered shape, and
wherein the flat area is arranged to be inward of a tapered area of the convex portion and to have a length less than that of the top surface such that a first distance is equal to or larger than a second distance, in which the first distance is equal to a length between an end portion of the flat area and an inflection point whereat the top surface of the convex portion is curved to a side surface thereof that is inclined and in which the second distance is equal to a length between the inflection point and an end portion of the side surface.

2. The display apparatus according to claim 1,
wherein the second touch electrode includes a plurality of second touch electrodes, and
wherein the touch sensor switch is formed so that when the display panel is deformed by the external pressure, the first touch electrode is brought into contact with the two or more second touch electrodes to electrically connect the two or more second touch electrodes with each other.

3. The display apparatus according to claim 1,
wherein a tapered angle of the convex portion is set to 70 degrees or less.

4. The display apparatus according to claim 3,
wherein the convex portion is formed so that a Young's modulus is set to 1 to 5 GPa, and a Poisson's ratio is set to 0.36 to 0.40.

5. The display apparatus according to claim 1,
wherein the first substrate includes a suspended column portion that is protruded in a convex shape toward the second substrate, the suspended column portion being formed on the surface opposed to the second substrate.

6. The display apparatus according to claim 1,
wherein the display panel is a liquid crystal panel including a liquid crystal layer provided between the first substrate and the second substrate.

7. An information input apparatus, comprising:
a touch panel including a first substrate, a second substrate, and a touch sensor switch formed therein, the second substrate being opposed to the first substrate at an interval,
wherein the touch sensor switch includes
a first touch electrode provided on a surface of the first substrate, the surface being opposed to the second substrate, and
a second touch electrode provided on a surface of the second substrate, the surface being opposed to the first substrate, the first touch electrode and the second touch electrode having an interval therebetween,
wherein the touch sensor switch has a structure in which the first touch electrode and the second touch electrode are brought into contact with each other when the touch panel is deformed by an external pressure,
wherein the first substrate includes a convex portion that protrudes in a convex shape toward the second substrate, the convex portion being formed on the surface opposed to the second substrate,
wherein the convex portion has a top surface opposed to the second substrate and includes a flat area formed on the top surface along the surface of the second substrate,
wherein the first touch electrode is formed in the flat area on the convex portion as an isolated pattern,
wherein the convex portion is formed in a forward tapered shape, and wherein the flat area is arranged to be inward of a tapered area of the convex portion and to have a length less than that of the top surface such that a first distance is equal to or larger than a second distance, in which the first distance is equal to a length between an end portion of the flat area and an inflection point whereat the top surface of the convex portion is curved to a side surface thereof that is inclined and in which the second distance is equal to a length between the inflection point and an end portion of the side surface.

* * * * *